United States Patent Office 3,445,426
Patented May 20, 1969

3,445,426
PENTAVALENT SILANE AND TETRAVALENT BORON CATECHOLATES AS POLYMERIZATION CATALYSTS
Chi-Long Lee, Midland, Mich., assignor to Dow Corning Corporation, Midland, Mich., a corporation of Michigan
Continuation-in-part of applications Ser. No. 580,850, Aug. 22, 1966, and Ser. No. 545,014, Apr. 25, 1966. This application June 5, 1967, Ser. No. 643,730
Int. Cl. C08g 31/24; C07f 7/18
U.S. Cl. 260—46.5        20 Claims

ABSTRACT OF THE DISCLOSURE

Pentavalent silicon complexes and tetravalent boron complexes of 1,2-dihydroxyphenols are used as polymerization catalysts for diorganocyclotrisiloxanes, 2,2,5,5-tetraorgano-1-oxa-2,5-disilacyclopentanes and 2,2,5,5-tetraorgano-1-aza-2,5-disilacyclopentanes in the presence of a hydroxyl compound and a polar solvent. Under certain conditions this method provides monodisperse polysiloxanes having a heterogeneity ratio of less than 1.3. For example, hexamethylcyclotrisiloxane is polymerized to a polymer having a molecular weight of 40,000 in one hour and 15 minutes by heating at 52° C., a solution of 40 g. of the siloxane, 40 g. of toluene, .04 g. of

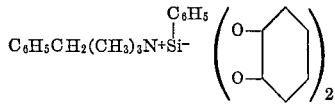

Figure 2:
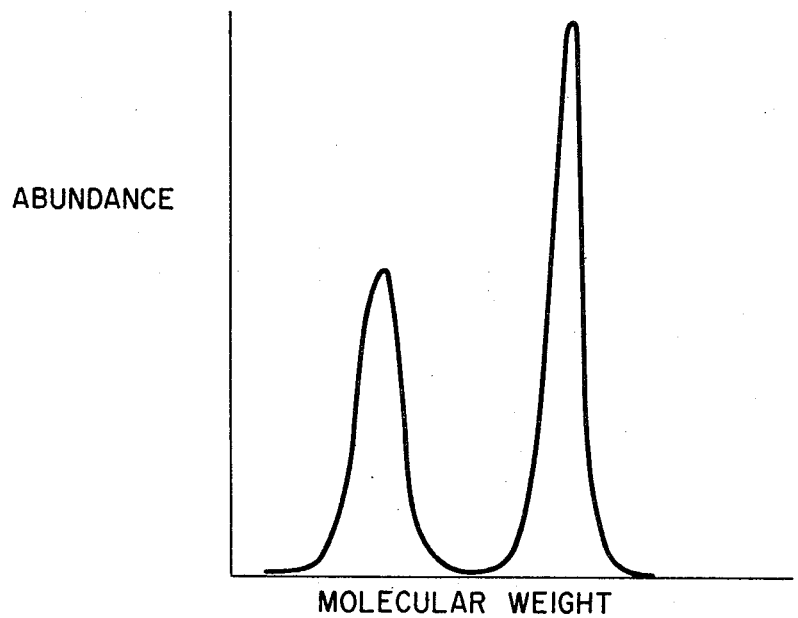

160 parts per million by weight water and 5.5 g. of dimethylsulfoxide. The heterogeneity ratio of the polymer was 1.1.

---

This application is a continuation-in-part of applicant's copending application Ser. No. 580,850, filed Aug. 22, 1966, now abandoned, which in turn was a continuation-in-part of and was copending with his application Ser. No. 545,014, filed Apr. 25, 1966, now abandoned.

The process of this invention fills a long standing need in the organosilicon industry in that one cannot produce polymers by commercially feasible methods without the production of large cyclic siloxanes having 12 or more silicon atoms in the ring. These materials contaminate presently prepared siloxane polymers and create several problems. For example, they reduce drastically the oleophobic nature of dimethylpolysiloxanes. Secondly, they contribute nothing to the strength of vulcanized siloxane elastomers, and therefore represent a useless portion of commercial polymers. Whereas, these large cyclics can often be removed by extracting the polymer with solvents, such extraction processes are tedious and are not generally feasible on a commercial basis. Furthermore, if the molecular weight of linear polysiloxanes and that of large cyclic siloxanes are not much different from each other, the removal of large cyclicsiloxanes become virtually impossible by any known method. The instant invention therefore represents a method of rapidly preparing siloxane polymers without producing these unwanted by-products.

In addition, the method of this invention has the added advantage of producing polymers of high thermal stability without the necessity of removing the polymerization catalysts. Some of the catalysts can be inactivated by heating to temperatures above 200° C. In other cases it is necessary to inactivate the catalyst by exposure to carbon dioxide or moderately weak acids such as acetic acid.

This invention relates to a process of contacting at a temperature below the decomposition temperature of the catalyst (A) a reactant selected from the group consisting of cyclotrisiloxanes of the formula $(R_2SiO)_3$, compounds of the formula

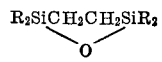

and of the formula

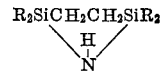

with (B) a solution of a catalytic amount of a catalyst of the formula

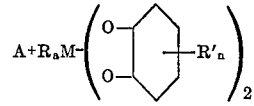

in the presence of (C) a polar solvent, free of active hydrogen having a dielectric constant which is at least the equal of the dielectric constant of acetonitrile, (D) there being present at least a trace of compound of the formula $R'(OH)_x$ or an organosilicon compound containing at least 1 SiOH group, the remaining valences of the silicon atoms being essentially all satisfied by H atoms, SiOSi bonds or R groups; there being on the average at least one R group per Si in (D); A is selected from the group consisting of radicals of the formula $Q_4X$ and alkali metal atoms, each R radical is selected from the group consisting of monovalent hydrocarbon and halohydrocarbon radicals, each Q group is a monovalent hydrocarbon radical, M is silicon or boron, $a$ has a value of 1 when M is silicon and a value of zero when M is boron, X is nitrogen or phosphorous, $n$ has a value from 0 to 2, R' is selected from the group consisting of hydrogen, hydrocarbon radicals, hydrocarbon ether radicals, and halohydrocarbon ether radicals, and $x$ is an integer from 1 to 4 inclusive, whereby a polymer of (A) is formed.

M is preferably silicon and X is preferably nitrogen. The R group of the catalyst which is bonded to M is preferably aryl, and A is preferably $Q_4X$ where X and Q are defined above.

Q and R can be any monovalent hydrocarbon radical, e.g. alkyl radicals such as methyl, ethyl, isopropyl, 2-ethylhexyl, or octadecyl; cycloalkyl radicals such as cyclohexyl; aliphatically unsaturated radicals such as vinyl, ethynyl, allyl, cyclohexenyl, or 2-hexenyl; or aryl-containing radicals such as phenyl, benzyl, tolyl, xenyl, naphthyl, or 2-phenylpropyl.

R can also be any monovalent halohydrocarbon radical, e.g. haloalkyl or cycloalkyl radicals such as chloromethyl, 3,3,3-trifluoropropyl, dibromohexyl, or chlorocyclopentyl; aliphatically unsaturated radicals such as chlorovinyl or tetrafluorocyclohexenyl; and aryl-containing radicals such as dibromophenyl, α,α,α-trifluorotolyl, tetrachloroxenyl and chlorobenzyl.

Examples of ingredient (A) are therefore:

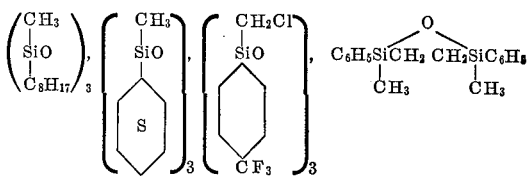

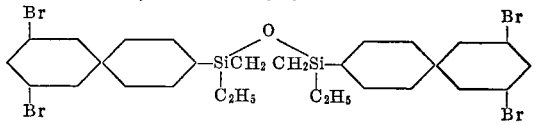

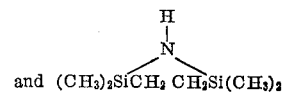

Examples of ingredient (B) are

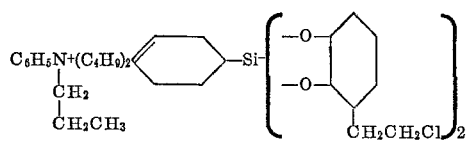

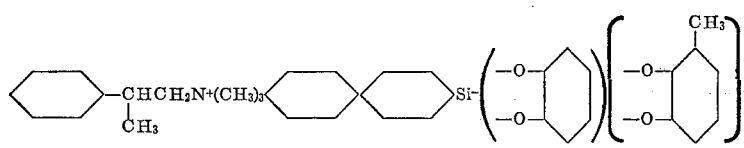

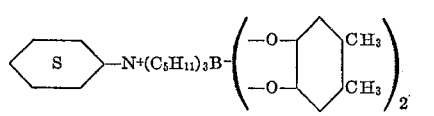

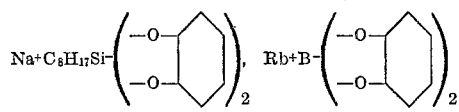

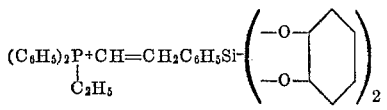

and 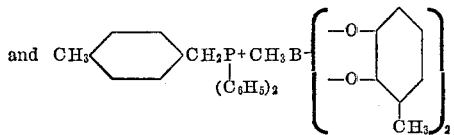

Examples of suitable polar solvents are acetonitrile, dimethyl sulfone, tetramethylene sulfone, diethyl sulfone, methylethyl sulfoxide, methylpropyl sulfone, etc. The term "free of active hydrogen" means free of hydrogen which is bonded to nitrogen, oxygen, sulfur, or phosphorus.

The catalysts of this invention containing Si and N can be prepared in the manner disclosed in Belgian Patent No. 662,250, granted Oct. 5, 1965. More particularly, they can be prepared by the reaction of one mole of a silane of the formula $RSi(OCH_3)_3$ or a borate of the formula $B(OCH_3)_3$ with 2 moles of

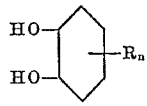

and at least one mole of a quaternary ammonium hydroxide of the formula $R_4NOH$, a quaternary phosphonium hydroxide of the formula, $R_4POH$, or an alkali metal hydroxide, frequently by simple mixing at room temperature, where R and $n$ are defined above. The formation of the catalysts containing B and P is more specifically set forth in copending application Ser. No. 625,966 and 625,965, respectively, both filed Mar. 27, 1967, by Cecil L. Frye. Both of these applications together with the Belgian patent are incorporated herein by reference.

The minimum amount of polar solvent which must be present is that amount which is sufficient to dissolve a large enough amount of the catalyst to render the reaction operative. Very small amounts can be used, as is shown in the examples. The maximum amount of polar solvent used is not critical.

The catalyst can also be used in very small amounts, down to 0.05 weight percent of the weight of the reactant to be polymerized, and sometimes even less. At least a catalytic amount of the catalyst must be in the dissolved state, either in the bulk polar solvent itself, in the reactant, or in a reactant-solvent mixture in the presence of a small amount of the polar solvent.

It is preferred for $n$ to be 0. It is also preferred for the reaction temperature to be from 25° to 200° C. or better still from 50° to 150° C., but in any event the polymerization must be carried out below the decomposition temperature of the catalyst which may be above or below 200° C.

The reaction can be performed either under pressure at atmospheric pressure or under partial vacuum, if desired.

In carrying out the polymerization one can employ mixtures of reactants (A) or mixtures of catalysts (B), or mixtures of polar solvents (C). One can also carry out the polymerization in the presence of a mixture of hydroxyl compounds (D). When a mixture of reactants (A) is employed one will obviously obtain copolymeric siloxanes. These polysiloxanes may be block copolymers rather than random copolymers.

When one employs a mixture of hydroxyl compounds (D) the resulting polymers will have two different types of end groups. To put it another way the resulting product may be a mixture of polymers, some of which have from one end type and group, and some of which have another. For example, when (D) is water the resulting polymer will have hydroxyl group on each end, however, when a mixture of water and say an alcohol such as methanol is employed one can obtain a polymer having both hydroxyl groups and methoxy groups on the ends thereof.

In order for the instant invention to operate it is necessary that there be at least a trace of the ingredient (D) present. In the case of water the amount of water normally present in the reactants or in the solvent is sufficient to fulfill this requirement. The reaction is significantly slowed, however, as the concentration of (D) drops below 10 parts per million of the reaction mixture. This is approximately the limit of detectability when one titrates for water using the Carl Fischer reagent.

The upper limit of the amount of (D) is not critical except that obviously excessive amounts of (D) may reduce the polymer size since (D) furnishes the endblocking groups. Optimum amounts of (D) in percent by weight vary with the character of the initiator (D). When water is used it is preferred that no more than 2% by weight based on the weight of (A) be present. However, the process is operative with higher amounts of water. When (D) is an end blocking group such as $Me_3SiOH$ then the amount used will depend upon the polymer size desired.

For the purpose of this invention (D) can be any organosilicon compound having at least one SiOH such as silanols, for example, $Me_2HSiOH$, trimethylsilanol, diphenylsilanediol, (chlorophenyl)silanetriol, trifluoropropylmethylsilanediol, bis-trifluoropropylmethylsilanol, dimethylphenylsilanol, triphenylsilanol,

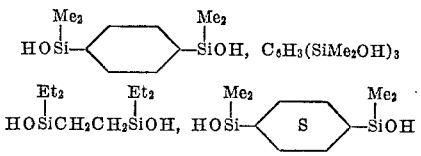

cyclohexyldimethylsilanol, tolylmethylsilanediol, β-phenylpropyldimethylsilanol, xenyldimethylsilanol, triethylsilanol, vinyldimethylsilanol, trihexylsilanol and bromophenylmethylsilanediol, and siloxanols such as

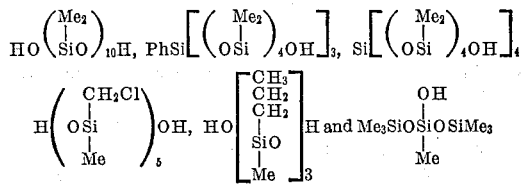

(D) can also be any alcohol such as an aliphatic alcohol such as methanol, ethanol, octadecanol; allyl alcohol, hexenyl alcohol, butynyl alcohol, β-chloroethanol and pentafluoroethanol; any cycloaliphatic alcohol such as cyclohexanol, cyclopentanol, chlorocyclohexanol and cyclohexenyl alcohol; aromatic alcohols such as phenol, cresol, hydroxyl bi-phenyl and chlorophenol; polyhydric alcohols such as ethylene glycol, glycerine trimethalol propane and pentaerythritol, and alcohol ethers such as monomethylether of ethylene glycol, the monomethylether of glycerine, tetraethylene glycol,

$HOCH_2CH_2OC_6H_{13}$ and tetrapropylene glycol.

The second aspect of the process of this invention is that with certain reactants and under certain conditions hereinafter specified one obtains a very narrow molecular weight distribution in the resulting polymer.

Preparation of monodisperse polymers

This invention also relates to a process of preparing polysiloxanes having a heterogeneity ratio of less than 1.3 which comprises mixing (A) a non-polar solvent solution of a reactant of the group $(R''R'''SiO)_3$ and

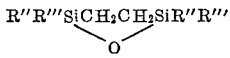

in which $R''$ is an aliphatic hydrocarbon radical and $R'''$ is an aliphatic hydrocarbon radical or a phenyl radical, with (B) a catalytic amount of a catalyst of the formula

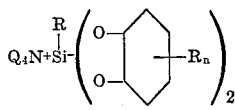

(C) a polar solvent free of active hydrogen having a dielectric constant which is at least equal of the dielectric constant of acetonitrile and (D) at least a trace of an active hydrogen compound of the group consisting of water, organosilicon compounds having at least one SiOH group in which essentially all the remaining valences of the silicon are satisfied by SiOSi bonds, H atoms, hydrocarbon radicals and halohydrocarbon radicals, there being on the average a total of at least one hydrocarbon and halohydrocarbon group per Si in (D), and aliphatic alcohols having at least one primary hydroxyl group and being soluble in the non-polar solvent for (A); in which Q is a monovalent hydrocarbon radical, each R is of the group monovalent hydrocarbon and monovalent halohydrocarbon radicals and $n$ is an integer from 0 to 2; and heating the mixture at a temperature below the decomposition temperature of (B) for a time sufficient to give a polysiloxane having an increased degree of polymerization and having the specified heterogeneity ratio.

In order to obtain a monodisperse polymer it is necessary to employ the reactants of the preceding paragraph, to use a non-polar solvent for (A) and to stop the polymerization before the polymer has lost its narrow distribution of molecular size (i.e. has become polydisperse). This means that the temperature-time relationship should be such that monodispersity is not lost. This relationship varies depending upon the nature of (A), the solvents employed, the type of catalyst, the concentration of catalyst and the temperature. Consequently, no meaningful numerical limitations can be put on the temperature and time of polymerization.

Figure 1:
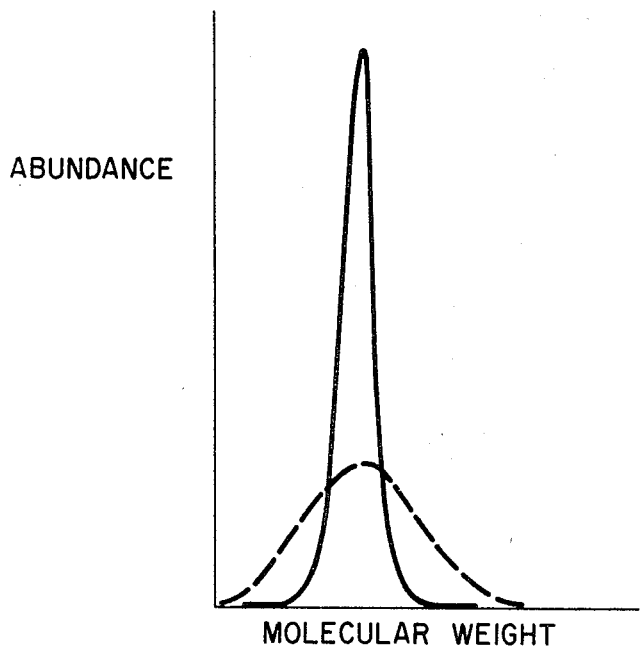

A comparison between the molecular weight distribution of a standard polydisperse polysiloxane and the monodisperse polymers of this invention is shown in the accompanying drawing FIG. 1. In this figure the dotted line represents the random distribution of molecular sizes in a potassium hydroxide polymerized polysiloxane. The solid line shows the molecular weight distribution in a monodisperse polymer or monomodal polymer of this invention.

Applicant believes (but does not limit the invention to any such mechanism) that the monodisperse polymers are formed by the reaction of (A) and (D) under the influence of (B) and (C) to produce an intermediate product of the formula

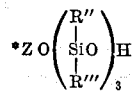

which in turn is activated by the catalyst causing it to react with another molecule of the cyclic trimer to give

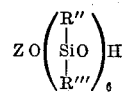

The molecule continues to grow by this mechanism. Since the reaction between the unreacted cyclotrisiloxane and the hydroxyl groups on the intermediate polymer is selective with respect to ring opening only and does not cause reshuffling of siloxane bonds or recyclization, the molecules will grow at the same rate, thus producing a narrow molecular weight distribution.

However, when all of the cyclic trimer has been consumed, further polymerization can occur only by means of hydroxyl condensation of the polymer molecules. Such a reaction is not selective but is random. Thus, the molecules will not grow at the same rate and polydispersity results. Even so, further polymerization does not cause formation of undesirable cyclic materials because the catalysts employed in this invention are not siloxane-bond rearranging catalysts. Thus even though monodispersity may be lost, the resulting polydisperse polymer is a useful material.

The maximum molecular weight at which monodispersity is lost varies with the polymer system and with the catalyst and reaction conditions. For example, I have found the critical molecular weight for dimethylpolysiloxane to be about 60,000 when the M is silicon and X is nitrogen, but it is believed that this figure can be raised in practically all cases by routing experimentation varying the catalysts and reaction conditions.

The average molecular weight of the monodisperse polymer can be raised by raising the concentration of the trimer reactant in the non-polar solvent, by controlling the reaction time or by minimizing the amount of end-blockers present. In other words, the single peak of the polymer shown in FIG. 1, can be shifted to the right or left as desired.

As noted above the monodisperse polymers are formed by polymerizing (A) in a non-polar solvent. The term "non-polar" has reference to solvents which have zero dipole moment. As is well known, these materials are hydrocarbons or symmeterical halohydrocarbons such as, for example, petroleum ether, benzene, toluene, cyclohexane, xylene, perchloroethylene, carbon tetrachloride, methylene chloride, p-dichlorobenzene, hydrogenated naphthylene and the like.

The concentration of (A) in the non-polar solvent is not critical. The lower the concentration of (A) the lower will be the average molecular weight of the monodisperse polymer.

---

*Z is H, R' or an organosilyl or an organosiloxy group depending upon the nature of (D).

It is noted that the catalyst useful in preparing the monodisperse polymers are limited to those quanternary ammonium complexes of the penta-coordinate silicon compounds, and that the reactant (D) is restricted to water, the defined organosilicon compounds and aliphatic alcohols having at least one primary hydroxyl group, which alcohols are soluble in the non-polar solvent for (A).

The term aliphatic alcohol as employed herein means those alcohols in which the primary hydroxyl group is attached to an aliphatic carbon atom. Thus, benzyl alcohol and homologs thereof are included in this term. It is also noted that the aliphatic alcohol must contain at least one primary hydroxyl group. The alcohol may contain secondary or tertiary hydroxyls as well, as long as there is at least one primary hydroxyl. Specific examples of operative alcohols for the production of monodisperse polymers are methanol, ethanol, octadecanol; benzyl alcohol, β-phenylethanol, gamma-phenylpropanol, ethylene glycol, propylene glycol, diethylene glycol; the monomethyl ether of ethylene glycol, glycerine and hexane diol; and halogenated aliphatic alcohols such as $CF_3CF_2OH$, $ClC_2H_4OH$, $ClC_6H_4CH_2OH$, $BrC_3H_6OH$ and $CH_3O\overset{\overset{CF_3}{|}}{C}HCH_2OH$ It should be appreciated that a very low solubility in the non-polar solvent is required since (D) can be employed in small amounts to initiate polymerization. As can be seen the alcohols are made up of C, H and O, the latter being in the form of OH and COC linkages.

Preparation of mixed monodisperse polymers

A further aspect of this invention is the preparation of mixtures of monodisperse polymers (bimodal or multimodal polymers. This can be done in two ways. First one can employ a mixture of initiators (D). The weight proportion of polymer initiated by each species of (D) will depend on the molar concentration of that particular (D) species in the reaction mixture. The rate of polymer growth of the initiated polymer will depend upon whether (D) is monofunctional and polyfunctional. For example, water is polyfunctional for the purpose of this invention since it reacts with a trimer molecule to produce a dihydroxyl derivative

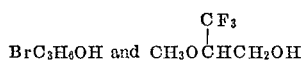

This derivative is now capable of growing on each end by reaction of each hydroxyl with additional trimer molecules. On the other hand, if methanol is used to initiate the reaction one obtains an intermediate material with a methoxy on one end and a hydroxyl on the other. Such a molecule can grow on only one end by reacting with additional trimer molecules. Thus, if a mixture of water and methanol is employed as ingredient (D), the molecules initiated by the water will grow twice as fast as those initiated by the methanol. Consequently, one obtains a bimodal polymer in which the molecular weight of the molecules initiated by the water will be twice the molecular weight of the molecules initiated by the methanol.

A bimodal monodisperse polymer is illustrated in FIG. 2 of the drawing which shows a double peak for the molecular weight distribution. Each fraction will have a heterogeneity ratio within the range of 1 to 1.3.

A second way to obtain a mixture of monodisperse polymers is to add initiator (D) at different times during the reaction. Thus, for example, one may add one-half of the water at time $x$, and the other half at time $2x$. The first portion of water will initiate polymerization and the polymers will grow as stated above. Upon addition of the second portion of water additional polymerization will be initiated and these polymers will start to grow. Thus, at any given time after $2x$ one will have two sets of polymers, each growing at the same rate, but those polymers initiated at time $x$ will always have a higher molecular weight than those polymers initiated at time $2x$. Each polymer fraction, however, will be a monodisperse polymer if the monodisperse conditions are maintained throughout the reaction.

It should be understood that one can prepare a mixture of more than two monodisperse portions (i.e. a multimodal polymer) by adding more than two portions of initiator (D). Obviously, if the mixture contains too many species of different molecular weight one obtains in effect a polydisperse polymer. However, applicant has found unique properties in polymers having up to 10 monodisperse fractions.

Mixtures of monodisperse polymers can also be obtained by adding successive portions of reactant (A) to the mixture.

Utility of the various types of polymers

As stated above the polydisperse polymers made by this invention are cyclic free and therefore obviate the difficulties caused by such materials.

The monodisperse polymers and the mixtures of monodisperse polymers of this invention are particularly useful in the preparation of organosilicon elastomers. Among other things they impart to the elastomers improved strength and better flowability for a given filler loading than is obtained with polydisperse polymers.

It has been known for sometime that one could control the modulus of organosilicon elastomer sealants by incorporating therein endblocked low molecular weight polymers. In most sealing applications it is necessary that the sealant have a combination of low modulus and excellent adhesion to the substrate. Low modulus is needed so that when the substrate expands or contracts the sealant will elongate without putting undue stress on the bond between the sealant and the substrate. If the modulus is too high, the stress at the sealant-substrate interface becomes so great that a rupture will occur. However, the incorporation of endblocked polymers in silicone building sealants create some severe problems.

For one thing, adhesion to the substrate is harmed because of the bleeding of the endblocked polymer at the interface. This bleeding also causes severe staining problems with the sealant. Hence silicone building sealants have been caught on the horns of a dilemma. That is one could leave out the endblocked low molecular weight polymers and run a risk of rupture of the sealant or the substrate, or one could leave them in and run the risk of poor adhesion and staining.

The use of the mixed monodisperse polymers of this invention, however, can obviate both of these problems. For example, by initiating the reaction with successive additions of water or by successive additions of hexamethylcyclotrisiloxane to the reaction mixture one can obtain a mixture of monodisperse polymers, each fraction of which is hydroxyl endblocked, but in which each fraction is of different molecular weight. Such a mixture will, when cured, produce low modulus silicone rubber without any endblocking in the polymer molecules. To applicant's knowledge this is the first time such an effect has been shown in silicone elastomers.

It is to be noted that most of the initiators (D) shown above produce polymers which have hydroxyl on at least one end of a molecule. Thus, when an initiator is, for example, trimethylsilanol one obtains a polymer of the formula

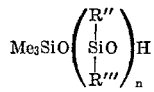

Any of the polymers prepared by this invention can be completely endblocked by reacting them with reactive silanes or silazanes, for example, hexamethyldisilazane, 3,3,3 - trifluoropropyldimethylchlorosilane, or phenyldimethylacetoxysilane. Such capped fluids will have the same heterogeneity ratio as the original polymer. These capped fluids, particularly of monodisperse-type makes superior hydraulic fluids.

Unique polymers of this invention

The monodisperse polymers prepared by the processes of this invention which have at least 18 siloxane units per molecule, are particularly unique for the above reasons. Accordingly, this application relates to polyorganosiloxanes of the formula

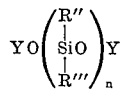

in which $n$ is an integer of at least 18, R″ and R‴ are as above defined and Y is selected from the group consisting of H, monovalent hydrocarbon radicals, monovalent halohydrocarbon radicals, monovalent hydrocarbon ether radicals, monovalent halohydrocarbon ether radicals and triorganosilyl groups in which the substituent groups are H, monovalent hydrocarbon or monovalent halohydrocarbon radicals, said siloxane being essentially free of cyclopolysiloxanes and having a heterogeneity ratio of less than 1.3.

The term "heterogeneity ratio" is defined as the weight average molecular weight divided by the number average molecular weight of the organopolysiloxane, excluding consideration of any cyclotrisiloxane present, which is the original reactant. As is well known this ratio can never be less than one.

Particularly useful monodisperse polymers are those siloxanes defined above having from 18 to 81 siloxane units. They can be used as plasticizers for organosilicon rubber. In as much as they are free of large cyclic polysiloxanes, they avoid the difficulties inherent to the latter materials.

The following examples are illustrative only and should not be construed as limiting the invention which is properly delineated in the appended claims. In the examples the abbreviation Me is used for methyl, Et for ethyl and Ph for phenyl.

POLYDISPERSE POLYMERS

Example 1

To 10 g. of hexamethylcyclotrisiloxane there was added 0.1 g. of a silane catalyst of the formula

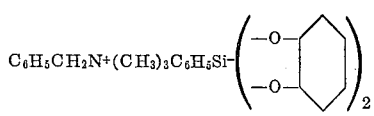

which did not go into solution during heating for 12 hours at 110° C. After this heating, no change in the mixture was noted.

The mixture was maintained at a temperature of 110° C. and 0.5 cc. of dimethylsulfoxide was added. The above silane catalyst dissolved, and the mixture became highly viscous in about 10 minutes (30,000 cs. at 25° C.).

Analysis by gel permeation chromatography showed the product to consist exclusively of linear dimethylpolysiloxane having a narrower molecular weight distribution than that of commercial dimethylpolysiloxane of the same viscosity and free of cyclic polysiloxanes and low molecular weight polysiloxanes other than starting cyclotrisiloxane.

Thermogravimetric analysis showed that the above unpurified product had the same thermal stability as commercial dimethylpolysiloxane polymers which have had their alkaline polymerization catalyst removed.

Example 2

When 5 g. of

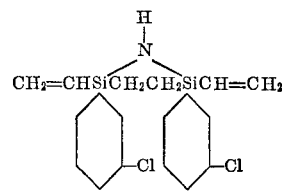

7 g. of heptane, and 0.2 g. of

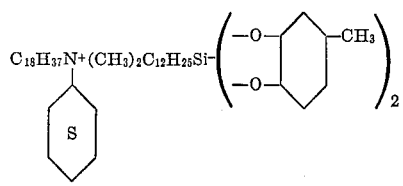

dissolved in 3 g. of tetramethylene sulfone are heated with agitation at 100° C. for one hour, a high polymer of

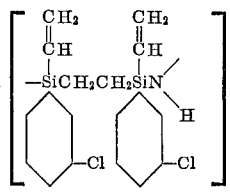

units is formed.

Example 3

To 3 g. of hexamethylcyclotrisiloxane and 3 g. of toluene there was added a trace of

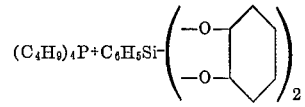

catalyst and a few drops of dimethylsulfoxide to dissolve the catalyst.

This was heated at 65° C. for 2 days to yield a very viscous, linear dimethtylpolysiloxane.

Gel permeation chromatography showed that no cyclic tetramer, pentamer, or hexamer was present in the product.

Example 4

To 3 g. of hexamethylcyclotrisiloxane and 3 g. of toluene there was added a trace of

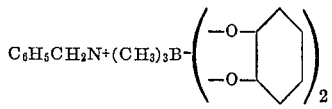

and a few drops of dimethylsulfoxide to dissolve the catalyst.

This was heated at 65° C. for 2 days and then allowed to stand at room temperature for one week. After this period a very viscous, linear polymer of dimethylsiloxane was recovered.

Gel permeation chromatography showed that no cyclic tetramer, pentamer, or hexamer was present in the product.

Example 5

To 3 g. of hexamethylcyclotrisiloxane and 3 g. of toluene there was added a few drops of dimethylsulfoxide and about 0.005 g. of

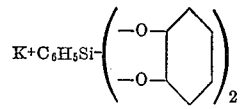

This was heated at 65° C. for three days to form a dimethylpolysiloxane of high molecular weight. No cyclotetrasiloxanes, cyclopentasiloxanes or other cyclic or lower polysiloxanes, except for the residue of the cyclotrisiloxane reactant, were detected in the product when it was examined by gel permeation chromatography.

Example 6

(a) To 5 g. of sym-triphenyltrimethylcyclotrisiloxane there was added 0.002 g. of the silane catalyst of Example 1 and 0.5 cc. of dimethylsulfoxide, causing the catalyst to dissolve, while the mixture was heated at 120° C. After one-half hour a viscous product was formed.

Gel permeation chromatography showed that the product consisted exclusively of a high polymer of phenylmethylsiloxane units having a narrow molecular weight distribution, and free of cyclopolysiloxanes except for the trimer reactant.

(b) The experiment of (a) was repeated, using sym-tris-3,3,3-trifluoropropyltrimethylcyclotrisiloxane as the cyclic trisiloxane ingredient. A high linear polymer was formed containing 3,3,3-trifluoropropylmethylsiloxane units.

Example 7

A mixture of 50 g. of hexamethylcyclotrisiloxane, 50 g. of toluene, .02 g. of

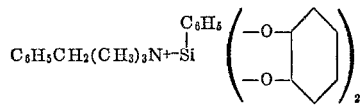

.05 g. of phenol and 3 cc. of dimethylsulfoxide was heated at 60- C. for 82 minutes. There was obtained a polydisperse polymer having a molecular weight of 34,000 and a heterogeneity ratio of 2. The polymer contained both SiOH and phenoxy end groups.

MONODISPERSE POLYMERS

Example 8

To 40 g. of hexamethylcyclotrisiloxane and 40 g. of toluene there was added a mixture of 0.04 g. of the silane catalyst of Example 1, 5.5 g. of dimethylsulfoxide, and 11.5 g. of toluene, causing the catalyst to dissolve. The mixture was heated at 52° C. for 1 hour and 15 minutes to yield a viscous polymer. A piece of Dry Ice was then added to inactivate the catalyst.

Gel permeation chromatography indicated that the number average molecular weight of the polysiloxane product was 40,000. No cyclic polysiloxanes or low molecular weight polysiloxanes were formed.

The heterogeneity ratio of the product $$\left(\frac{\text{weight average mol. wt.}}{\text{number average mol. wt.}}\right)$$

was about 1.1, compared with a similar ratio of about 4 for commercial dimethylpolysiloxane of the same viscosity. In other words, the above product possessed a much narrower molecular weight distribution.

The process of this invention can be routinely used to produce polymers having a heterogeneity ratio of no more than 1.2.

Example 9

To 3 g. of hexamethylcyclotrisiloxane there was added 3 g. toluene, 0.004 g. of the silane catalyst

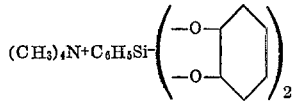

and 2 drops of dimethylsulfoxide to dissolve the catalyst, while heating the mixture at 65° C. After 2 hours the mixture was very viscous.

Analysis showed that the produce was exclusively a dimethylpolysiloxane of high molecular weight, having a heterogeneity ratio of less than 1.2.

Example 10

To 3 g. of

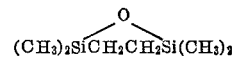

there was added 3 g. of toluene, 0.004 g. of the silane catalyst of Example 1, and 2 drops of dimethylsulfoxide to dissolve the catalyst. This was heated at 60° C. for 5 hours to form a very viscous product.

Dry Ice was added to the product to inactivate the catalyst. After this, analysis by gel permeation chromatography showed that the product was exclusively a high polymer of the unit formula

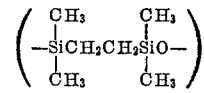

having a heterogeneity ratio of less than 1.2.

Equivalent results are obtained at a reaction temperature of 25° C., although the reaction is slower.

Example 11

Equivalent results are obtained upon repeating the experiment of Example 8, substituting acetonitrile for the dimethylsulfoxide ingredient, although the polymerization is slower.

Example 12

When a solution of 5 g. of hexamethylcyclotrisiloxane, 5 g. of sym-trivinyltrihexylcyclotrisiloxane, 10 g. of heptane, 1 g. of N,N'-dimethylformamide, and 0.5 g. of

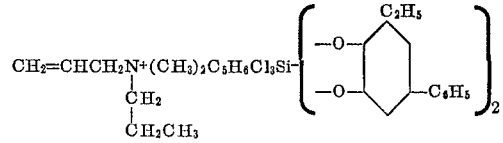

is heated under pressure at 70° C. for 6 hours, a linear block copolymer of

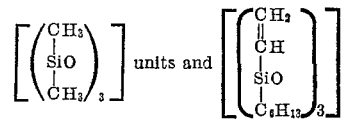

units is formed.

Example 13

To 3 g. of hexamethylcyclotrisiloxane and 3 g. of toluene there was added a few drops of dimethylsulfoxide and about 0.005 g. of

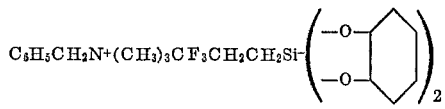

This was heated for seven minutes at 60° C. to form a viscous dimethylpolysiloxane.

Example 14

To 3 g. of hexamethylcyclotrisiloxane and 3 g. of toluene there was added a few drops of dimethylsulfoxide and about 0.005 g. of

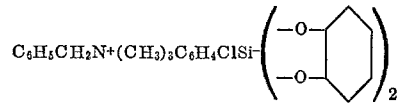

This was heated for seven minutes at 85° C. to form a viscous dimethylpolysiloxane.

Example 15

The experiment of Example 14 was repeated using

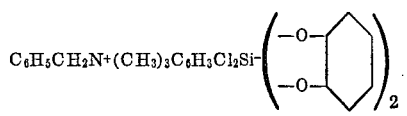

as the catalyst.

Some polymerization to form dimethylpolysiloxane was noted after heating for 2 hours at 85° C.

Example 16

To 100 g. of hexamethylcyclotrisiloxane and 100 g. of toluene there was added 6.6 g. of dimethylsulfoxide and 0.04259 g. of the catalyst of Example 1. The water content of this mixture was determined by Karl Fischer titration to be about 160 parts per million.

This mixture was heated at 60° C.

(a) After 15 minutes of heating, a sample of the reaction mixture was removed and determined by gel permeation chromatography to contain a dimethylpolysiloxane having a molecular weight of about 2,100 (about 28 siloxane units), and heterogeneity ratio of about 1.1. The material was free of cyclopolysiloxanes except for the cyclic trimer reactant.

(b) After 20 minutes of heating, another sample was removed and determined in the same manner to contain a dimethylpolysiloxane having a molecular weight of about 7,500 (about 1001 siloxane units), and a heterogeneity ratio of about 1.1. Again, the material was free of cyclic products.

Example 17

This example illustrates how the molecular weight of the polymer product can be controlled by controlling the concentration of ingredient (a) in the reaction mixture:

(A) To 20 g. of hexamethylcyclotrisiloxane and 80 g. of toluene there was added 6 cc. of dimethylsulfoxide and 0.0226 g. of the catalyst of Example 1.

This was heated at 60° C. for 96 hours to produce a 90% yield of a dimethylpolysiloxane having a molecular weight of about 7,400 (about 100 siloxane units) and having a heterogeneity ratio of about 1.1. No cyclopolysiloxane products were noted.

(B) A mixture of 10 g. of hexamethylcyclotrisiloxane and 90 g. of toluene was treated and reacted in the above manner to produce an 89% yield of a dimethylpolysiloxane having a molecular weight of about 4,800 (about 62 siloxane units) and a heterogeneity ratio of about 1.1. Again, no cyclopolysiloxane products were noted.

Example 18

A copolymer of the average formula

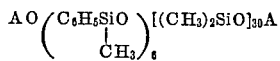

having a heterogeneity ratio of less than 1.3, and essentially free of cyclopolysiloxanes, is obtained when a mixture of

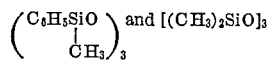

is reacted with the catalyst and solvents of Example 8 in the same proportions and under the same reaction conditions as in that example, terminating the reaction with $CO_2$ and stripping the product when the desired molecular weight is obtained. Each A is a hydrogen atom.

Example 19

80 g. of hexamethylcyclotrisiloxane was mixed with 20 g. of toluene, 3 cc. of dimethylsulfoxide, .02 g. of the catalyst of Example 1, and 0.9 g. of trimethylsilanol and the mixture was heated at 60° C. for 75 minutes. $CO_2$ was introduced by means of Dry Ice to terminate the reaction. The resulting polymer had a molecular weight of 6,400 and a heterogeneity ratio of less than 1.2. The polymer was of the formula

Example 20

A mixture of 50 g. of hexamethylcyclotrisiloxane, 50 g. of toluene, 3 ml. of dimethylsulfoxide, .02 g. of the catalysts of Example 1 and .13 g. of ethylene glycol was heated at 60° C. for 70 minutes. A monodisperse polymer having a molecular weight of 8,600 was obtained. The precise structure of this polymer is not known but there are —$SiOCH_2CH_2OSi$— groups in the molecule.

Example 21

The experiment of Example 20 was repeated except that .46 g. of glycerine was used in lieu of the ethylene glycol, and the mixture was heated at 60° C. for 65 minutes. A monodisperse polymer was obtained.

Example 22

This example illustrates a continuous method for producing monodisperse polydimethylsiloxane. 50 g. of hexamethylcyclotrisiloxane, 50 g. of toluene, 5 ml. of dimethylsulfoxide, .02 g. of the catalyst of Example 1 and 150 parts per million water were mixed and pumped through a coil at a rate of 1.7 ml. per minute. The coil was immersed in a heated bath and maintained at 60° C. The reaction time in the coil was 50 minutes. Upon emerging from the coil the polymer solution was dropped into a reservoir filled with methanol. The polymer precipitated and was separated from the unreacted hexamethylcyclotrisiloxane, the dimethylsulfoxide and the toluene. The resulting polymer had a molecular weight of 21,000 and a heterogeneity ratio of less than 1.1. The polymer was of the formula

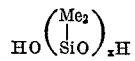

Example 23

This example illustrates completely endblocking a monodisperse polymer. 10 g. of a polymer of the formula

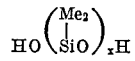

having a molecular weight of 16,000 and a heterogeneity ratio of less than 1.1 was dissolved in 10 g. of toluene. 1 g. of pyridine was added and then 1 g. of trimethylchlorosilane was added with stirring. The product was washed with water until neutral and the solvent was removed to obtain a polymer of the formula

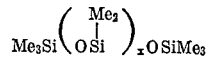

This polymer was determined by gel permeation chromatography to have the same heterogeneity ratio as a starting polymer.

Example 24

Monodisperse polymers are obtained when the following siloxanes are employed in the process of Example 8: $(PhMeSiO)_3$, $(EtMeSiO)_3$ and

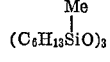

Example 25

Monodisperse polymers are obtained when the following alcohols and silanols are each employed in the process of Example 19.

Alcohol

MeOCH₂CH₂OH $MeO\left(\underset{|}{\overset{CH_3}{C}}HCH_2O\right)_3H$

ClC₂H₄OH

CF₃CH₂OH

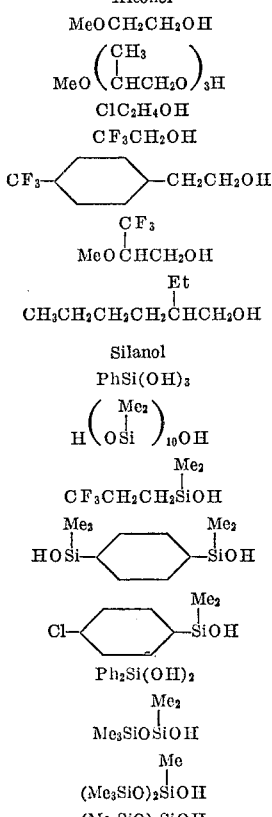

MeOĊHCH₂OH (with CF₃ substituent)

$CH_3CH_2CH_2CH_2\underset{|}{\overset{Et}{C}}HCH_2OH$

Silanol

PhSi(OH)₃

$H\left(\underset{|}{\overset{Me_2}{O}Si}\right)_{10}OH$ $CF_3CH_2CH_2\underset{|}{\overset{Me_2}{S}i}OH$

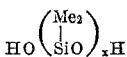
HOSi—⌬—SiOH (with Me₂ groups)

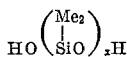
Cl—⌬—SiOH (with Me₂)

Ph₂Si(OH)₂

$Me_3SiO\underset{|}{\overset{Me_2}{S}i}OH$ $(Me_3SiO)_2\underset{|}{\overset{Me}{S}i}OH$ (Me₃SiO)₃SiOH

Example 26

This example shows the lower viscosity obtained when monodisperse polymers are used in room temperature curing siloxane rubber formulations. A comparison is made with a polydisperse KOH polymerized fluid.

Polymer A was made using a monodisperse polymer of the formula $$HO\left(\underset{|}{\overset{Me_2}{S}iO}\right)_xH$$

having a viscosity of 3,600 cs. at 25° C. as follows:

.5 g. of NiCl₂ and 72 g. of (MeHSiO)₄ was refluxed one hour at 135° to 140° C. The container was filled with N₂ and 350 g. of the monodisperse polymer in 650 ml. of toluene was added over a period of 15 minutes. The mixture was refluxed for 5½ hours to give a product containing SiH groups. The excess NiCl₂ was removed by filtration and the excess (MeHSiO)₄ and solvent were distilled leaving a residual polymer of 6,500 cs. at 25° C.

Polymer B was made in an identical manner except that a 4,800 cs. polydisperse polymer of the formula $$HO\left(\underset{|}{\overset{Me_2}{S}iO}\right)_xH$$

was used. The product after reaction with the (MeHSiO)₄ had a viscosity of 4,800 cs.

200 g. of each of polymer A and B was mixed with 50 g. of a (Me₃Si)₂NH treated fume silica and the mixture allowed to stand at room temperature. The viscosity of the mixture was determined on a Brookfield viscosimeter and found to be as shown below:

| Polymer: | Time | |
|---|---|---|
| | 4 hours | 36 days |
| A | 26,200 | 40,960 |
| B | 72,000 | 98,800 |

Both of the above mixtures cured to a rubber when mixed with .5 part dibutyl tin diacetate. However, formulation A did a much better job of impregnating porous materials than did B.

Example 27

MIXED MONODISPERSE POLYMERS

This example shows the preparation of two polymer species by employing two different initiators.

50 g. of hexamethylcyclotrisiloxane, 50 g. of toluene, 3 cc. of dimethylsulfoxide, .02 g. of the catalyst of Example 1, .163 g. of trimethylsilanol, 160 parts per million water was heated at 60° C. for 60 minutes. The resulting polymer was analyzed by gel permeation chromatography and was found to consist of a mixture of

$Me_3SiO\left(\underset{|}{\overset{Me_2}{S}iO}\right)_xH$ having a molecular weight of 15,500 and

$HO\left(\underset{|}{\overset{Me_2}{S}iO}\right)_xH$ having a molecular weight of 31,000 in the weight ratio of about 2.5 to 1 respectively.

Example 28

50 g. of hexamethylcyclotrisiloxane, 50 g. toluene, 3 ml. of dimethylsulfoxide, .02 g. of the catalyst of Example 1, 140 parts per million water and .15 g. of methanol was heated at 60° C. for 70 minutes. There was obtained a mixture of

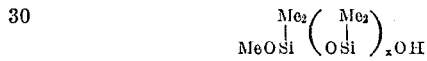
$MeO\underset{|}{\overset{Me_2}{S}i}\left(\underset{|}{\overset{Me_2}{O}Si}\right)_xOH$ having a molecular weight of 7,000 and

$HO\left(\underset{|}{\overset{Me_2}{S}iO}\right)_xH$ having a molecular weight of 14,000. These two polymers were in the weight ratio of 1 to 6 respectively and each polymer was monodisperse.

Example 29

A mixture of 50 g. of hexamethylcyclotrisiloxane, 50 g. toluene, .02 g. of the catalyst of Example 1, .23 g. of ethanol, 3 ml. of dimethylsulfoxide and 150 parts per million water was heated at 60° C. for 88 minutes. The product was a mixture of 2 polymers. One had a molecular weight of 21,000 and was of the formula

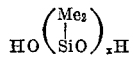
$HO\left(\underset{|}{\overset{Me_2}{S}iO}\right)_xH$ and the other had a molecular weight of 9,000 and was of the formula

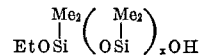
$EtO\underset{|}{\overset{Me_2}{S}i}\left(\underset{|}{\overset{Me_2}{O}Si}\right)_xOH$ These two polymers were each monodisperse and were in the weight ratio of 1 to 1.5 respectively.

Example 30

A mixture of 50 g. of hexamethylcyclotrisiloxane, 50 g. of toluene, 3 ml. dimethylsulfoxide, .02 g. the catalyst of Example 1, .54 g. of benzyl alcohol and 150 parts per million of water was heated at 60° C. for 62 minutes. There was obtained a mixture of 2 polymers, one having the formula

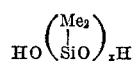
$HO\left(\underset{|}{\overset{Me_2}{S}iO}\right)_xH$ having a molecular weight of 12,000 and the other having the formula

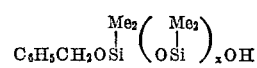
$C_6H_5CH_2O\underset{|}{\overset{Me_2}{S}i}\left(\underset{|}{\overset{Me_2}{O}Si}\right)_xOH$ having a molecular weight of 6,000. These polymers were present in the weight ratio of 1 to 7 respectively.

Example 31

This experiment shows the preparation of mixed monodisperse polymers by the intermittent addition of the cyclotrisiloxane.

Step 1

50 g. of hexamethylcyclotrisiloxane, 50 g. of toluene, 2 ml. dimethylsulfoxide, .022 g. of the catalyst of Example 1, were mixed and heated at 60° C. for 30 minutes.

Step 2

Then a mixture of 25 g. of hexamethylcyclotrisiloxane, 25 g. of toluene, and 1 cc. of dimethylsulfoxide was added.

Step 3

After 10 minutes a batch identical with that of step 2 was added and this addition was repeated 2 more times. In this experiment both the toluene and the dimethylsulfoxide contained water. There was obtained a mixture of 5 monodisperse polymers.

Example 32

This example shows the lower modulus obtained by employing a multimodal polymer when compared to an equivalent monomodal polymer.

Polymer A was prepared by mixing:

(1) 300 g. of hexamethylcyclotrisiloxane, 300 g. of toluene, 18 ml. of dimethylsulfoxide, .12 g. of the catalyst of Example 1 and 380 parts per million water and heating the mixture at 60° C. for 30 minutes,
(2) 150 g. of hexamethylcyclotrisiloxane, 50 g. of toluene and 9 ml. of dimethylsulfoxide were then added and the reaction continued,
(3) after 10 minutes a second mixture of 150 g. hexamethylcyclotrisiloxane, 150 g. toluene and 9 ml. of dimethylsulfoxide was added, and
(4) after 10 minutes a third mixture of 150 g. hexamethylcyclotrisiloxanes, 150 g. toluene and 9 ml. of dimethylsulfoxide was added and the reaction was continued for 50 minutes and then terminated by cooling to 0° C. by the addition of Dry Ice. As can be seen portion (1) polymerized for 100 minutes, portion (2) for 70 minutes, portion (3) for 60 minutes and portion (4) for 50 minutes.

The polymer was precipitated by addition to MeOH and the solvent and unreacted trisiloxane was removed. The resulting product was a hydroxyl endblocked dimethylpolysiloxane containing 4 monodisperse fractions. Fraction (1) had a molecular weight of 135,000 and fraction (2) to (4) combined had an average molecular weight of 58,000 as determined by gel permeation chromatography.

Polymer B was prepared by dissolving 25 lbs. hexamethyltricyclosiloxane in 25 lbs. toluene. 9.4 g. of the catalyst of Example 1 was dissolved in 490 ml. of dimethylsulfoxide. The toluene and the dimethylsulfoxide each contained about 100 parts per million water.

The mixture of cyclosiloxane and toluene was heated to 60° C. then the solution of the catalyst in the dimethylsulfoxide was added. After 2 hours the reaction mixture was quenched by the addition of large amounts of water. The organic layer was added to methanol to precipitate the polymer. There was obtained a hydroxy-endblocked dimethylpolysiloxane having a viscosity of 1,040 cs. at 25° C.

Polymers A and B were each formulated into a rubber of the following formulation:

100 parts by weight polymer
11 parts fume silica
1 part $TiO_2$ and
7.85 parts $CH_2=CHSi(ON=CMeEt)_3$.

Each formulation was allowed to cure for 7 days by exposing it to the atmosphere. The physical properties of each was then determined as shown in the table below:

|  | Polymer A | Polymer B |
|---|---|---|
| Durometer, Shore A | 21 | 45 |
| Modulus at 150% elongation in lbs. per sq. inch | 60 | 200 |
| Tensile, lbs. per sq. inch | 240 | 293 |
| Percent elong. at break | 500 | 227 |
| Die B tear (lbs. per inch) | 27 | 21 |

It is to be noted that the decrease in modulus was not accompanied by any significant change in tensile or tear strength.

That which is claimed is:

1. A method which comprises heating at a temperature below the decomposition temperature of (B) a mixture of:
(A) a reactant selected from the group consisting of cyclotrisiloxanes of the formula $(R_2SiO)_3$, compounds of the formula

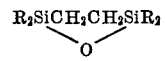

and of the formula

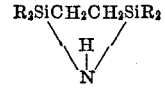

with
(B) a solution of a catalytic amount of a catalyst of the formula

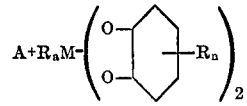

in the presence of
(C) a polar solvent, free of active hydrogen having a dielectric constant which is at least equal to the dielectric constant of acetonitrile,
(D) there being present at least a trace of a compound of the formula $R'(OH)_x$ or an organosilicon compound containing at least one SiOH group, the remaining valences of the silicon atoms being essentially all satisfied by hydrogen atoms, SiOSi bonds or R groups, there being on the average at least 1 R group per Si in (D);
in which:
A is selected from the group consisting of radicals of the formula $Q_4X$ and alkali metal atoms, each
R is selected from the group consisting of monovalent hydrocarbon, and halohydrocarbon radicals, each
Q is a monovalent hydrocarbon radical,
M is silicon or boron,
$a$ has a value of 1 when M is silicon and a value of zero when M is boron,
X is nitrogen or phosphorous,
$n$ has a value from 0 to 2,
R' is selected from the group consisting of hydrogen, hydrocarbon radicals, halohydrocarbon radicals, hydrocarbon ether radicals, and halohydrocarbon ether radicals, and
$x$ is an integer from 1 to 4 inclusive, whereby a polymer of (A) is formed.

2. The method of claim 1 in which (A) is $(R_2SiO)_3$.
3. The method in accordance with claim 2 in which (A) is $[(CH_3)_2SiO]_3$.
4. The method in accordance with claim 2 in which (C) is dimethylsulfoxide.
5. The method in accordance with claim 2 in which (B) is

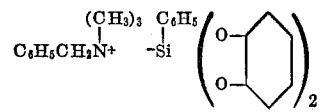

6. The method in accordance with claim 2 in which (D) is water.

7. A method of preparing a polysiloxane having a heterogeneity ratio of less than 1.3 which comprises mixing:
(A) a non-polar solvent solution of a reactant of the group (R"R'"SiO)₃ and

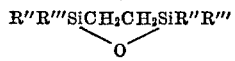

in which:
R" is an aliphatic hydrocarbon radical, and
R'" is an aliphatic hydrocarbon radical or a phenyl radical, with
(B) a catalytic amount of a catalyst of the formula

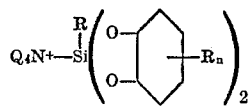

in the presence of
(C) a polar solvent free of active hydrogen having a dielectric constant which is at least equal to the dielectric constant of acetonitrile and with
(D) at least a trace of an active hydrogen compound of the group consisting of water; organosilicon compounds having at least one SiOH group in which essentially all of the remaining valences of the silicon are satisfied by SiOSi bonds, hydrogen atoms, hydrocarbon radicals or halohydrocarbon radicals, there being on the average a total of at least one hydrocarbon or halohydrocarbon radicals per Si in (D); and aliphatic alcohols having at least one primary hydroxyl group and being soluble in the non-polar solvent for (A); in which:
Q is a monovalent hydrocarbon radical, each
R is of the group consisting of monovalent hydrocarbon and monovalent halohydrocarbon radicals, and
n is an integer from 0 to 2 and heating the mixture at a temperature below the decomposition temperature of (B) for a time sufficient to give a polysiloxane having an increased degree of polymerization and having the specified heterogeneity ratio.

8. The method of claim 7 in which (A) is hexamethylcyclotrisiloxane.

9. The method of claim 8 in which (C) is dimethylsulfoxide.

10. The method of claim 8 in which (D) is water.

11. The method of claim 7 in which (A) is added intermittently to the reaction mixture.

12. The method in accordance with claim 7 in which (D) is added intermittently to the reaction mixture.

13. The method in accordance with claim 7 in which more than one type of (D) is added to the reaction mixture.

14. An organopolysiloxane having a heterogeneity ratio of less than 1.3 and being essentially free of cyclopolysiloxanes and being of the formula

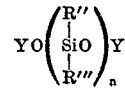

in which
n is an integer of at least 18,
R" is a monovalent aliphatic hydrocarbon radical,
R'" is of the group consisting of monovalent aliphatic hydrocarbon radicals and phenyl radicals, and
Y is selected from the group consisting of hydrogen, monovalent hydrocarbon radicals, monovalent halohydrocarbon radicals, monovalent hydrocarbon ether radicals, monovalent halohydrocarbon ether radicals, and triorganosilyl groups in which the substituent groups are hydrogen, monovalent hydrocarbon radicals, or monovalent halohydrocarbon radicals.

15. A composition in accordance with claim 14 in which Y is hydrogen, and R" and R'" are both methyl.

16. A composition in accordance with claim 14 in which n is an integer from 18 to 81 inclusive.

17. A cured elastomer comprising the polymer of claim 14.

18. A mixture of monodisperse polysiloxanes, each component of the mixture having a heterogeneity ratio of less than 1.3, and there being no more than 10 components in said mixture, each polysiloxane being of the formula

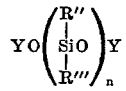

in which
n is an integer of at least 18,
R" is an aliphatic hydrocarbon radical,
R'" is of the group consisting of alphatic hydrocarbon radicals and phenyl radicals,
Y is selected from the group consisting of hydrogen, monovalent hydrocarbon radicals, monovalent halohydrocarbon radicals, monovalent hydrocarbon ether radicals, monovalent halohydrocarbon ether radicals, and triorganosilyl groups in which the substituent groups are hydrogen, monovalent hydrocarbon radicals, or monovalent halohydrocarbon radicals, said mixture of siloxanes being essentially free of cyclopolysiloxanes.

19. A composition in accordance with claim 18 where Y is hydrogen and R" and R'" are both methyl.

20. A cured elastomer comprising the composition of claim 18.

References Cited

UNITED STATES PATENTS

| | | | |
|---|---|---|---|
| 3,133,110 | 5/1964 | Morehouse et al. | 260—46.5 |
| 3,146,251 | 8/1964 | Brown et al. | 260—46.5 |
| 3,151,099 | 9/1964 | Ceyzeriat et al. | 260—46.5 |
| 3,243,410 | 3/1966 | McVannel | 260—46.5 |
| 3,294,740 | 12/1966 | McVannel | 260—46.5 |
| 3,304,271 | 2/1967 | Baney. | |
| 3,337,497 | 8/1967 | Bostick | 260—46.5 |
| 3,355,475 | 11/1967 | Baney | 260—46.5 |

DONALD E. CZAJA, *Primary Examiner.*

M. I. MARQUIS, *Assistant Examiner.*

U.S. Cl. X.R.

260—2, 429, 448.2, 448.8